(12) United States Patent
Mori et al.

(10) Patent No.: US 7,581,783 B2
(45) Date of Patent: Sep. 1, 2009

(54) CAB FOR CONSTRUCTION MACHINERY

(75) Inventors: Tadashi Mori, Takamatsu (JP); Koudou Tsuji, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/570,929

(22) PCT Filed: Sep. 9, 2004

(86) PCT No.: PCT/JP2004/013127

§ 371 (c)(1),
(2), (4) Date: Mar. 8, 2006

(87) PCT Pub. No.: WO2005/025965

PCT Pub. Date: Mar. 24, 2005

(65) Prior Publication Data
US 2007/0024088 A1   Feb. 1, 2007

(30) Foreign Application Priority Data
Sep. 9, 2003   (JP) .............................. 2003-316710

(51) Int. Cl.
*B60J 7/00* (2006.01)
(52) U.S. Cl. ................... 296/190.08; 296/205
(58) Field of Classification Search ............ 296/190.08, 296/205, 190.01, 190.03
See application file for complete search history.

(56) References Cited

U.S. PATENT DOCUMENTS

| | | | | |
|---|---|---|---|---|
| 4,094,545 A * | 6/1978 | Kramer | ................ | 296/190.08 |
| 4,135,757 A * | 1/1979 | Smith et al. | ............ | 296/190.03 |
| 4,332,415 A * | 6/1982 | Williams | .................. | 296/213 |
| 4,506,756 A * | 3/1985 | Bergous | .................... | 296/204 |
| 4,605,259 A * | 8/1986 | Hurlburt | ................ | 296/190.08 |
| 4,650,242 A * | 3/1987 | Obe et al. | .............. | 296/190.08 |
| 4,772,065 A * | 9/1988 | Nakata et al. | .......... | 296/190.08 |
| 4,917,434 A * | 4/1990 | Sumitani | ................. | 296/180.1 |
| 5,016,721 A * | 5/1991 | Yamamoto et al. | ....... | 180/89.13 |
| 5,096,254 A * | 3/1992 | Sparke | .................. | 296/193.06 |
| 5,273,340 A * | 12/1993 | Nelson et al. | .......... | 296/190.08 |
| 5,549,352 A * | 8/1996 | Janotik et al. | ............... | 296/205 |
| 5,560,672 A * | 10/1996 | Lim et al. | .............. | 296/187.05 |
| 5,681,076 A * | 10/1997 | Yoshii | ........................ | 296/210 |
| 6,065,799 A * | 5/2000 | Suwabe et al. | ......... | 296/190.08 |
| 6,073,992 A * | 6/2000 | Yamauchi et al. | ...... | 296/203.01 |

(Continued)

FOREIGN PATENT DOCUMENTS

CN   1388846   1/2003

(Continued)

*Primary Examiner*—Kiran B. Patel
(74) *Attorney, Agent, or Firm*—Frishauf, Holtz, Goodman & Chick, P.C.

(57) ABSTRACT

A cab for a construction machine is provided which is cost effective, good in strength as a cab, usable in narrow sites where an obstacle exists, and good in front visibility and design.

The cab for a construction machine has left front, left rear, right front and right rear pillars 12, 13, 14, 15 which vertically extend. The left rear and right rear pillars 13, 15 are made of a pipe material, and the rear part of the cab has greater rigidity than the front part of the cab. The left front and right front pillars 12, 14 are respectively constituted by at least two press-molded parts which are respectively formed into a specified shape by press molding.

3 Claims, 8 Drawing Sheets

U.S. PATENT DOCUMENTS

| | | | | |
|---|---|---|---|---|
| 6,102,472 | A * | 8/2000 | Wallstrom | 296/205 |
| 6,123,378 | A * | 9/2000 | Teply et al. | 296/205 |
| 6,241,310 | B1 * | 6/2001 | Patelczyk | 296/205 |
| 6,244,369 | B1 * | 6/2001 | Yunoue et al. | 296/190.08 |
| 6,282,790 | B1 * | 9/2001 | Jaekel et al. | 296/205 |
| 6,325,449 | B1 * | 12/2001 | Sorensen et al. | 296/190.08 |
| 6,325,450 | B2 * | 12/2001 | Sakyo et al. | 296/190.08 |
| 6,394,212 | B1 * | 5/2002 | Takano et al. | 180/89.13 |
| 6,485,084 | B2 * | 11/2002 | Sorensen et al. | 296/190.01 |
| 6,502,896 | B1 * | 1/2003 | Nakata et al. | 296/190.05 |
| 6,568,746 | B2 | 5/2003 | Sakyo et al. | |
| 6,623,067 | B2 * | 9/2003 | Gabbianelli et al. | 296/205 |
| 6,655,728 | B2 * | 12/2003 | Sano et al. | 296/205 |
| 6,948,768 | B2 * | 9/2005 | Corcoran et al. | 296/190.08 |
| 6,957,845 | B2 * | 10/2005 | Rager | 296/205 |
| 7,032,958 | B2 * | 4/2006 | White et al. | 296/193.01 |
| 7,044,535 | B2 * | 5/2006 | Durand | 296/205 |
| 7,048,082 | B2 * | 5/2006 | Mori et al. | 296/190.08 |
| 2001/0030448 | A1 * | 10/2001 | Wilson | 296/190.11 |
| 2002/0011743 | A1 * | 1/2002 | Tiziano | 296/190.08 |
| 2002/0135207 | A1 | 9/2002 | Sakyo | |
| 2002/0149232 | A1 | 10/2002 | Sakyo et al. | |
| 2002/0153748 | A1 | 10/2002 | Sakyo et al. | |
| 2004/0212221 | A1 * | 10/2004 | Sato | 296/190.08 |

FOREIGN PATENT DOCUMENTS

| | | |
|---|---|---|
| EP | 1191154 A1 | 3/2002 |
| EP | 1380497 A2 | 1/2004 |
| JP | 2000-198469 A | 7/2000 |
| JP | 2001-115491 A | 4/2001 |
| JP | 2001-140283 A | 5/2001 |
| JP | 2002-088812 A | 3/2002 |
| JP | 2002-115268 A | 4/2002 |
| JP | 2002-285890 A | 10/2002 |

* cited by examiner

CAB FOR CONSTRUCTION MACHINERY

This application is a U.S. National Phase Application under 35 USC 371 of International Application PCT/JP2004/013127 filed Sep. 9, 2004.

1. Technical Field

The present invention relates to a cab for a construction machine such as hydraulic excavators.

2. Background Art

Some cabs for a construction machine such as hydraulic excavators are composed of a framework made of pipe materials and panels etc. joined to the framework (see e.g., Patent Document 1). Other cabs are constructed by a plurality of panels joined to one another without use of a framework made of pipe materials (see e.g., Patent Document 2). More specifically, in the cabs having a framework formed from pipe materials, left front, left rear, right front and right rear posts each made of a pipe material are provided; the left front post and the right front post are coupled by upper and lower coupling members made of a pipe material; the left rear post and the right rear post are coupled by upper and lower coupling members made of a pipe material; the left front post and the left rear post are coupled by upper and lower coupling members made of a pipe material; and the right front post and the right rear post are coupled by upper and lower coupling members made of a pipe material. In the cabs formed by joining a plurality of panels, one side face portion (which has a cab entrance), for instance, includes an inner-outer pair of front panels and an inner-outer pair of rear panels located. The inner-outer pair of front panels are joined by spot welding etc. and the inner-outer pair of rear panels are joined by spot welding etc.

Patent Document 1: Japanese Unexamined Published Patent Application No. 2002-285890 (Pages 3-5 and FIG. 1)

Patent Document 2: Japanese Unexamined Published Patent Application No. 2001-115491 (Pages 4-6 and FIGS. 4, 7)

DISCLOSURE OF THE INVENTION

The cabs having a framework made of pipe materials such as that of Patent Document 1, however, present the drawback that use of a number of pipe materials increases costs and use of a number of joints for coupling the pipe materials increases the number of assembling processes and therefore man-hour, which leads to poor productivity. On the other hand, the cabs, which do not use a framework composed of pipe members such as that of Patent Document 2, do not cost much but is inferior in strength. When a construction machine is operated in a narrow site where an obstacle exists, there is a likelihood that the cab may hit the obstacle during operation and therefore the cab is required to have excellent strength. An attempt has been made to mitigate shocks from outside by providing the rear side of the cab with protecting members. This attempt, however, has revealed the problem that the provision of the protecting member makes the design of the cab worse and increases the size of the cab. To achieve increased rigidity in the front part of the cab, the front pillars (posts) need to be thickened, which leads to a decrease in front visibility.

The invention is directed to overcoming the shortcomings of the prior art and a primary object of the invention is therefore to provide a cab for a construction machine which is cost effective, good in strength as a cab, usable in narrow sites where an obstacle exists, and good in front visibility and design.

Means of Solving the Problems

According to a first aspect of the present invention, a cab for a construction machine is provided which includes left front, left rear, right front and right rear pillars 12, 13, 14, 15 which extend vertically, wherein the left front and right front pillars 12, 14 are formed by press molding and the left rear and right rear pillars 13, 15 are each made of a pipe material.

In the cab for a construction machine according to the first aspect of the present invention, the rear part of the cab has greater rigidity than the front part of the cab so that improved rigidity and buckling strength can be achieved in the rear part of the cab. Incidentally, the operator can easily check the front view but tends to neglect to check the rear view, and therefore the rear side of the cab more often gets a shock from the outside than the front side. In view of this, the cab can cope with the problem of shocks from the outside by increasing the rigidity of the rear side of the cab. In addition, the left front pillar 12 and the right front pillar 14 are formed by press molding so that there is no need to form these pillars 12, 14 from a pipe material. Although the front pillars are formed from press-molded parts and therefore the front pillars are inferior in strength compared to cases where they are formed from a pipe material, the front pillars do not need such strength that the rear pillars are required to have. The reason for this is that since the operator can easily check the forward view, it is highly possible to avoid a collision of the front part of the cab with an obstacle or the like.

According to a second aspect of the present invention, the right front pillar 14 is connected to the right rear pillar 15 by passing through a ceiling portion.

According to a third aspect of the present invention, the left front pillar 12 is connected to the front part of the ceiling portion.

According to a fourth aspect of the present invention, a vertically extending intermediate pillar 85 is disposed between the left front pillar 12 and the left rear pillar 13.

According to a fifth aspect of the present invention, the intermediate pillar 85 is connected to the right front pillar 14 or the right rear pillar 15 by passing through the ceiling portion.

Effect of the Invention

In the cab for a construction machine according to the first aspect of the present invention, the cab can be protected from deformation, damage etc. caused by shocks from the outside by increasing the rigidity of the rear part of the cab. In addition, since there is no need to provide the construction machine with a protecting member or the like that is not integral with the cab in order to mitigate shocks from the outside, the cab has good design. Further, since the front part of the cab does not need great rigidity, the cab can avoid a structure which interrupts the front field of view and therefore has improved front visibility. Further, since it is unnecessary to form the left front pillar and the right front pillar from a pipe material, cost reduction can be achieved.

In the cab for a construction machine according to the second aspect of the present invention, since the ceiling portion is supported by the right front pillar, the rigidity of the ceiling portion increases.

In the cab for a construction machine according to the third aspect of the present invention, since the left front pillar may be short in length, it can be easily formed by press molding and a wide entrance can be made.

In the cab for a construction machine according to the fourth aspect of the present invention, since a left side face portion is reinforced by the intermediate pillar, sufficient strength can be imparted to the left side face portion, even if an opening for the entrance is formed in the left side face portion, so that stable formation of the opening becomes possible.

In the cab for a construction machine according to the fifth aspect of the present invention, since the ceiling portion is supported by the intermediate pillar, the rigidity of the ceiling portion increases.

BRIEF DESCRIPTION OF THE DRAWINGS

FIG. 13 is depicted for comparison between press-molded parts and pipe materials, wherein FIG. 13(a) is a strength comparison graph and FIG. 13(b) is a cost comparison graph.

EXPLANATION OF REFERENCE NUMERALS

12: left front pillar
13: left rear pillar
14: right front pillar
15: right rear pillar
19: exterior member (front face panel)
20: exterior member (rear face panel)
30, 31, 78: coupling member
85: intermediate pillar

BEST MODE FOR CARRYING OUT THE INVENTION

Figure 3:
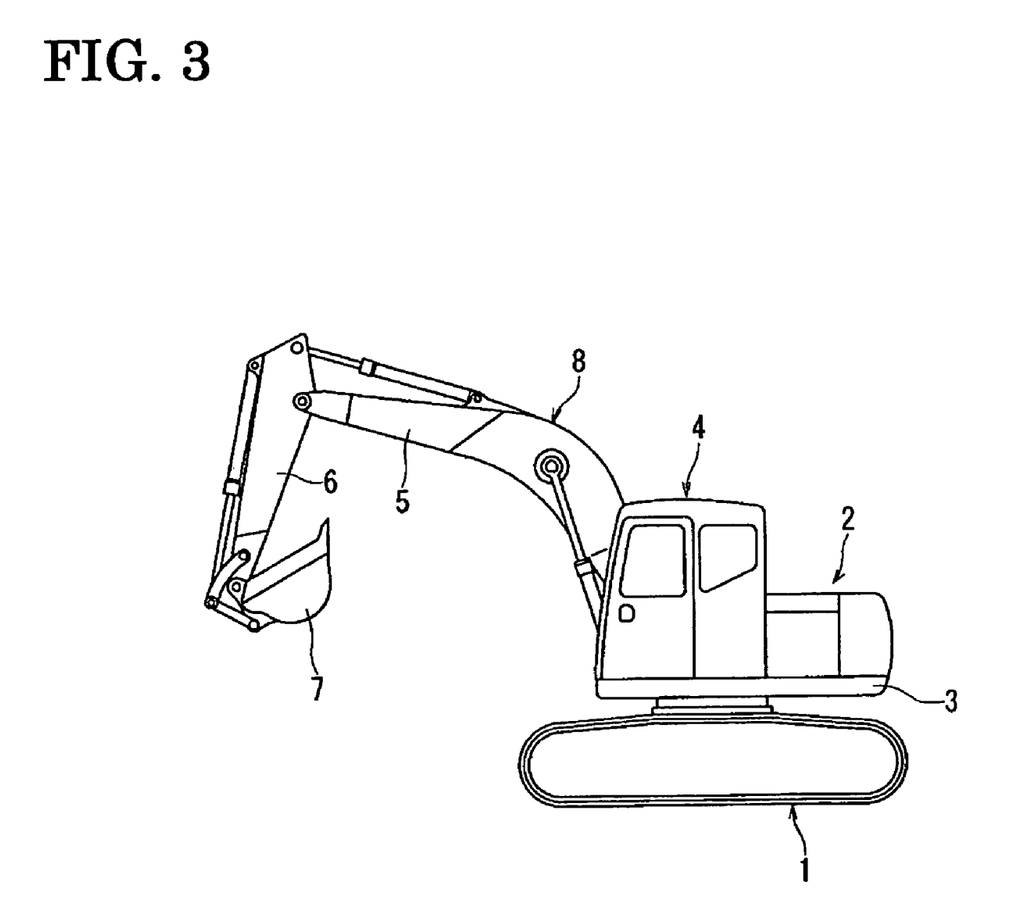
FIG. 3 is a side view of the construction machine.

Referring now to the accompanying drawings, a cab for a construction machine will be described in detail according to preferred embodiments of the invention. FIG. 3 schematically shows a hydraulic excavator of a construction machine. The hydraulic excavator has lower machinery 1 and upper structure 2 mounted on the lower machinery 1. The upper structure 2 has a driver's cabin (cab) 4 on its frame 3. The upper structure 2 further includes a work implement 8 or the like having a boom 5, an arm 6 and a bucket 7. When the terms "front side (foreside)", "rear side" (opposite to the front side), "left side" and "right side" are used in this embodiment, it should be understood that these terms have reference to the structure of the construction machine as it would appear to the operator sitting on the driving seat (not shown) of the cab 4 of the construction machine.

Figure 1:
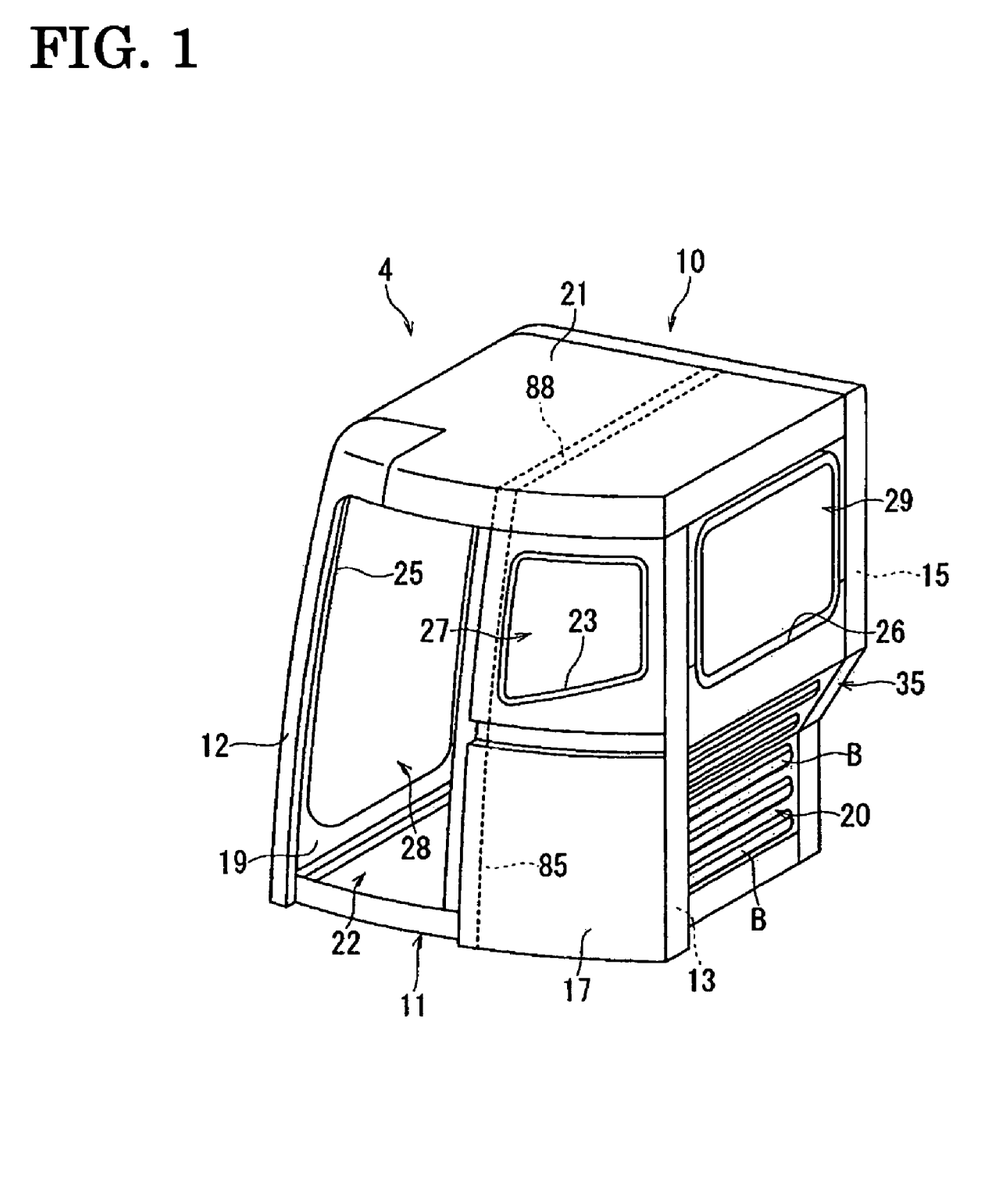
FIG. 1 is an overall schematic perspective view illustrating a cab for a construction machine according to one embodiment of the invention.
Figure 2:
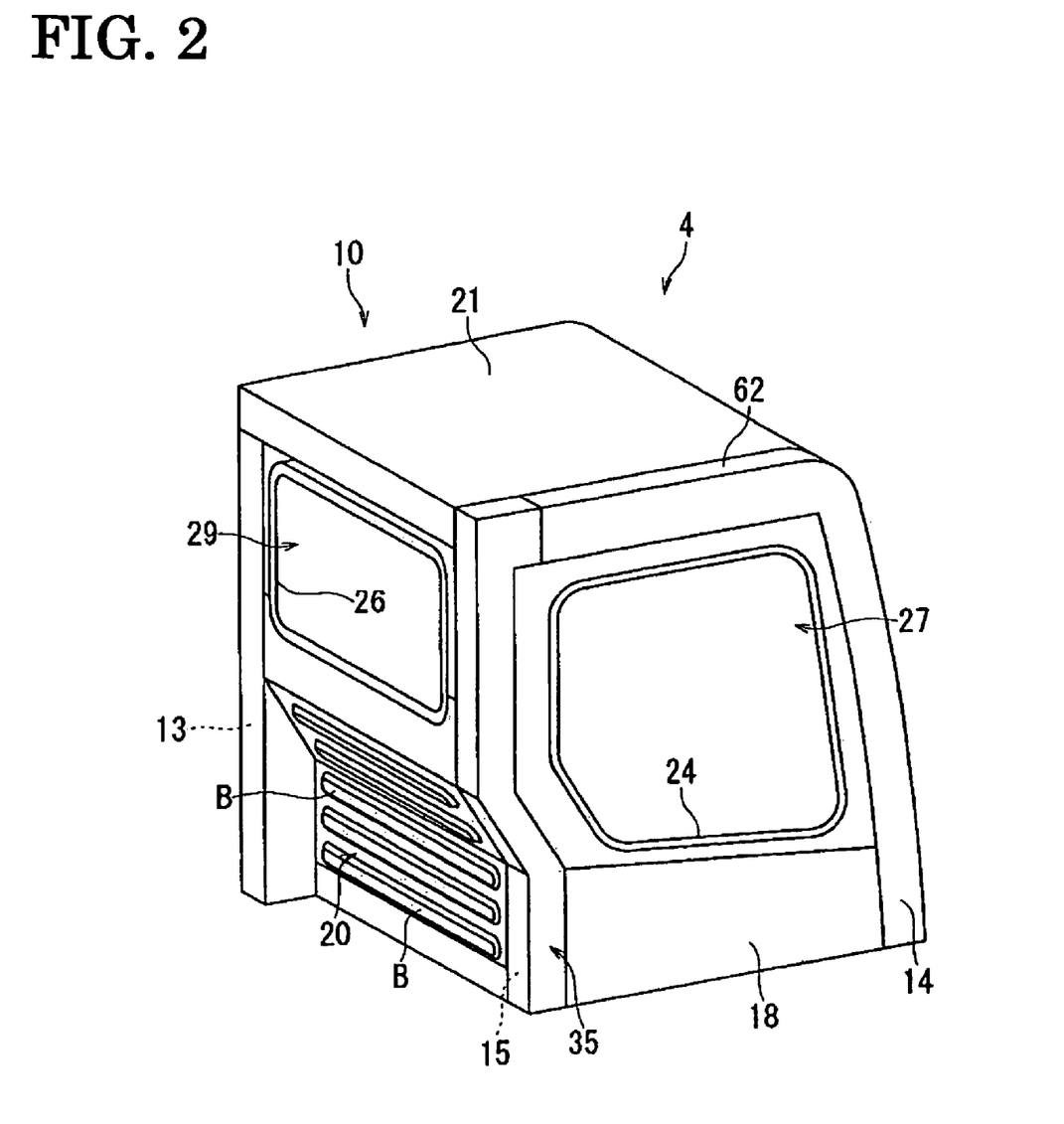
FIG. 2 is an overall schematic perspective view of the cab for the construction machine.

As shown in FIGS. 1 and 2, the cab 4 is composed of a cab body 10 and a floor frame 11 which close up the lower opening of the cab body 10. The cab body 10 includes a left front pillar 12, left rear pillar 13, right front pillar 14 and right rear pillar 15 which extend in a vertical direction. A door side panel 17 is disposed between the left front pillar 12 and the left rear pillar 13, whereas an opposite door side panel 18 is disposed between the right front pillar 14 and the right rear pillar 15. A front face panel 19 is disposed between the left front pillar 12 and the right front pillar 14, whereas a rear face panel 20 is disposed between the left rear pillar 13 and the right rear pillar 15. A ceiling panel 21 is disposed at the ceiling. An opening, i.e., entrance 22 is provided between the door side panel 17 and the left front pillar 12. A door (not shown) is installed in this entrance 22. Further, the door side panel 17 and the opposite door side panel 18 are provided with window openings 23, 24, respectively. The upper parts of the front face panel 19 and rear face panel 20 are provided with window openings 25, 26 respectively. A glass plate is fitted in each of the window openings 23, 24, 25, 26, so that side window parts 27, a front window part 28 and a rear window part 29 are formed.

Figure 4:
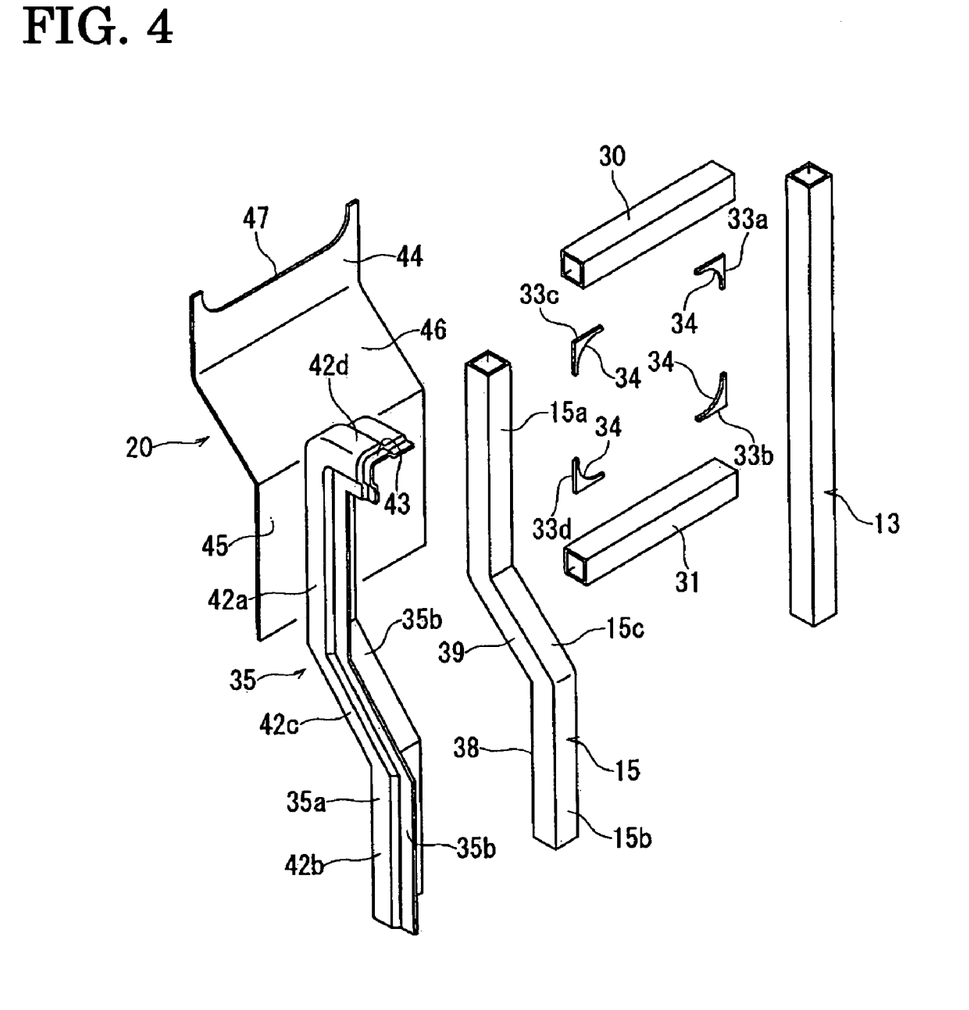
FIG. 4 is a perspective view of a left rear pillar and a right rear pillar.

Incidentally, the left rear pillar 13 and the right rear pillar 15 are each made of a commercially available pipe material (rectangular-tube-like part) called "steel pipe". This pipe material is in widespread use and produced by molding so as to have a specified cross-sectional shape. When distributed, the pipe material has a substantially uniform cross-sectional shape over the entire length of it. As shown in FIG. 4, the left rear pillar 13 vertically extends in an upright condition, whereas the right rear pillar 15 is composed of a first upright portion 15a located at an upper position, a second upright portion 15b located at a lower position and an inclining portion 15c which couples the first upright portion 15a and the second upright portion 15b to each other. The left rear pillar 13 is coupled to the right rear pillar 15 through a pair of coupling members 30, 31 each consisting of a pipe material made of steel or the like. In this case, the upper end of the left rear pillar 13 is coupled to the upper end of the first upright portion 15a of the right rear pillar 15 by the upper coupling member 30, and the intermediate portion of the left rear pillar 13 is coupled to the lower end of the first upright portion 15a of the right rear pillar 15 by the lower coupling member 31. The left rear pillar 13, the right rear pillar 15 and the upper and lower coupling members 30, 31 define a window opening 26 for the rear window part 29. Disposed at the corners of the window opening 26 are corner members 33a, 33b, 33c, 33d. Each corner member 33a, 33b, 33c, 33d includes a notch 34 having the shape of a quarter round. The corners of the window glass are fitted in these notches 34 of the corner members 33a, 33b, 33c, 33d, respectively.

Figure 5:
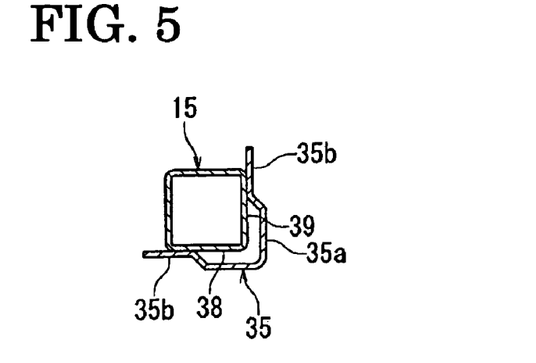
FIG. 5 is a cross-sectional view of the right rear pillar.

A cover member 35 is attached to the right rear pillar 15. As shown in FIGS. 4 and 5, the cover member 35 is composed of a main body portion 35a of L-shaped cross-section and edge portions 35b which are formed, extending continuously from both side edges, respectively, of the main body portion 35a. The cover member 35 covers a rear end face 38 and outer face 39 of the right rear pillar 15. Herein, the cover member 35 has a first upright portion 42a, a second upright portion 42b and an inclining portion 42c in correspondence with the shape of the right rear pillar 15, the inclining portion 42c coupling the first and second upright portions 42a, 42b to each other. A projecting portion 42d is formed, extending forwardly, continuously from the first upright portion 42a. Formed at an end of the projecting portion 42d is a draw portion 43.

The coupling members 30, 31 are not necessarily formed from a pipe material but may be formed from press-molded parts. Specifically, the coupling members 30, 31 may be respectively formed from a pipe-shaped member composed of a pair of press-molded parts joined together. Since the left rear pillar 13 and the right rear pillar 15 are each formed from a pipe material, the rigidity of the rear part of the cab does not decrease even if a material which is somewhat poor in strength is used for the coupling members 30, 31.

The rear face panel (exterior member) 20 is made of a metal such as a steel plate and composed of a first portion 44 located at an upper position and a second portion 45 located at a lower position, and an inclining portion 46 for coupling the first and second portions 44, 45 to each other. The first portion 44 is disposed so as to cover the lower coupling member 31 from the outside (rear side) and has a notch 47 at its upper edge. The notched edge of the notch 47 constitutes the lower edge of the rear window part 29. The angle of inclination of the inclining portion 46 corresponds to the angle of inclination of the inclining part 15c of the right rear pillar 15. The right end portion of the inclining part 46 is positioned so as to extend along the outer face (outer end face) of the inclining portion 15c of the right rear pillar 15. The right end portion of the second portion 45 is positioned so as to extend along the outer face (outer end face) of the second upright portion 42b of the right rear pillar 15. In this case, the left edge of the rear face panel 20 is in contact with the door side panel 17. Although not shown in FIG. 4, the rear face panel 20 has bead portions B for reinforcement at the second portion 45 and the inclining portion 46 as shown in FIGS. 1 and 2, the bead portions B being constituted by a plurality of laterally extending ridge parts. While the bead portions B extend in a horizontal direction in the drawings, they may extend in a vertical direction. The shape, length and number of bead portions B may be arbitrarily determined.

Since the left rear pillar 13 and the right rear pillar 15 are respectively formed from a pipe material, the exterior member (rear face panel) 20 is not required to have excellent strength. Therefore, the rear side panel 20 may be made from a non-metal material such as synthetic resin. This leads to the advantage that various means such as bonding, rigging and welding may be employed according to the material of the rear face panel 20, for coupling the rear face panel 20, the left rear pillar 13 and the right rear pillar 15.

Figure 6:
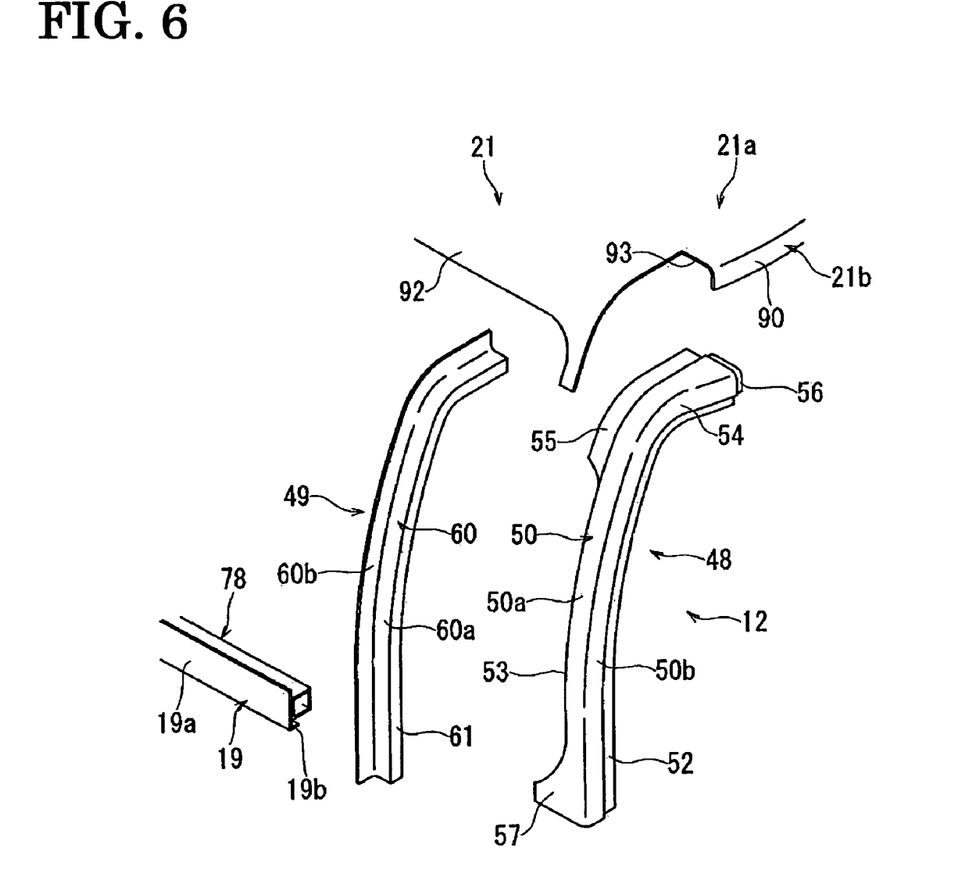
FIG. 6 is an exploded perspective view of a left front pillar.
Figure 7:
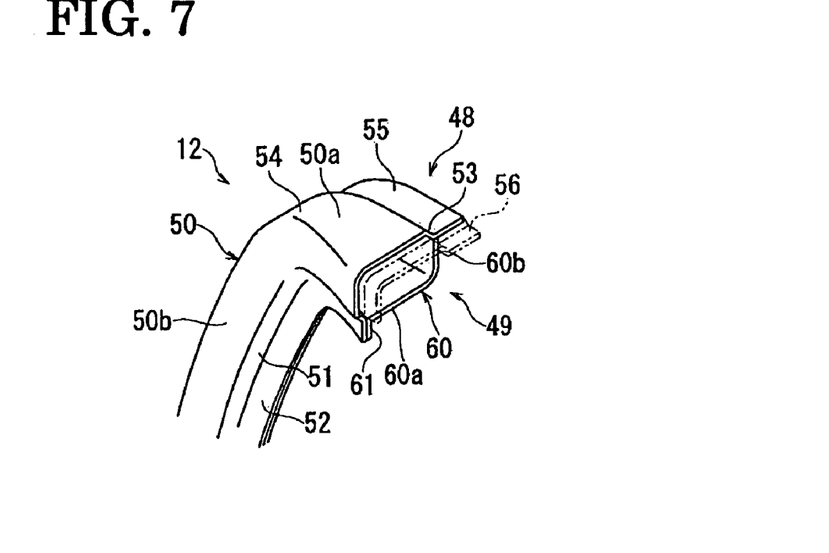
FIG. 7 is a perspective view of the left front pillar.

As just described, the left rear pillar 13 and the right rear pillar 15 are formed from a pipe material, whereas the left front pillar 12 and the right front pillar 14 are formed from press-formed parts. Specifically, the left front pillar 12 is formed, as shown in FIGS. 6 and 7, by joining (e.g., spot-welding) a first member 48 to a second member 49, the first and second members 48, 49 being respectively formed into a specified shape by press-molding. In this case, the first member 48 includes (i) a main body portion 50 of L-shaped cross-section having a front wall portion 50a and an outer wall portion 50a; (ii) an inner collar portion 51 extending continuously from the outer wall portion 50a; (iii) a joint collar portion 52 projecting from the inner collar portion 51; and (iv) a bent piece portion 53 projecting from the front wall portion 50a. The upper part of the first member 48 slightly curves rearward and, at this curved portion 54, a projecting piece portion 55 is provided so as to inwardly project from the bent piece portion 53. Provided at the upper end of the first member 48 is a draw portion 56. Provided at the lower end of the first member 48 is a protuberant portion 57 projecting to the right. The second member 49 has (i) a main body portion 60 of L-shaped cross-section composed of a first wall portion 60a and a second wall portion 60b; and (ii) a joint collar portion 61 extending continuously from the first wall portion 60a of the main body portion 60. The upper part of the second member 49 is slightly curved rearward.

While the joint collar portion 52 of the first member 48 overlapping the joint collar portion 61 of the second member 49 and the second wall portion 60b of the main body portion 60 of the second member 49 being butted against the bent piece portion 53 of the first member 48, the first member 48 is joined to the second member 49 as shown in FIG. 7. Thereby, the left front pillar 12 having a rectangular hollow portion can be constructed.

Figure 8:
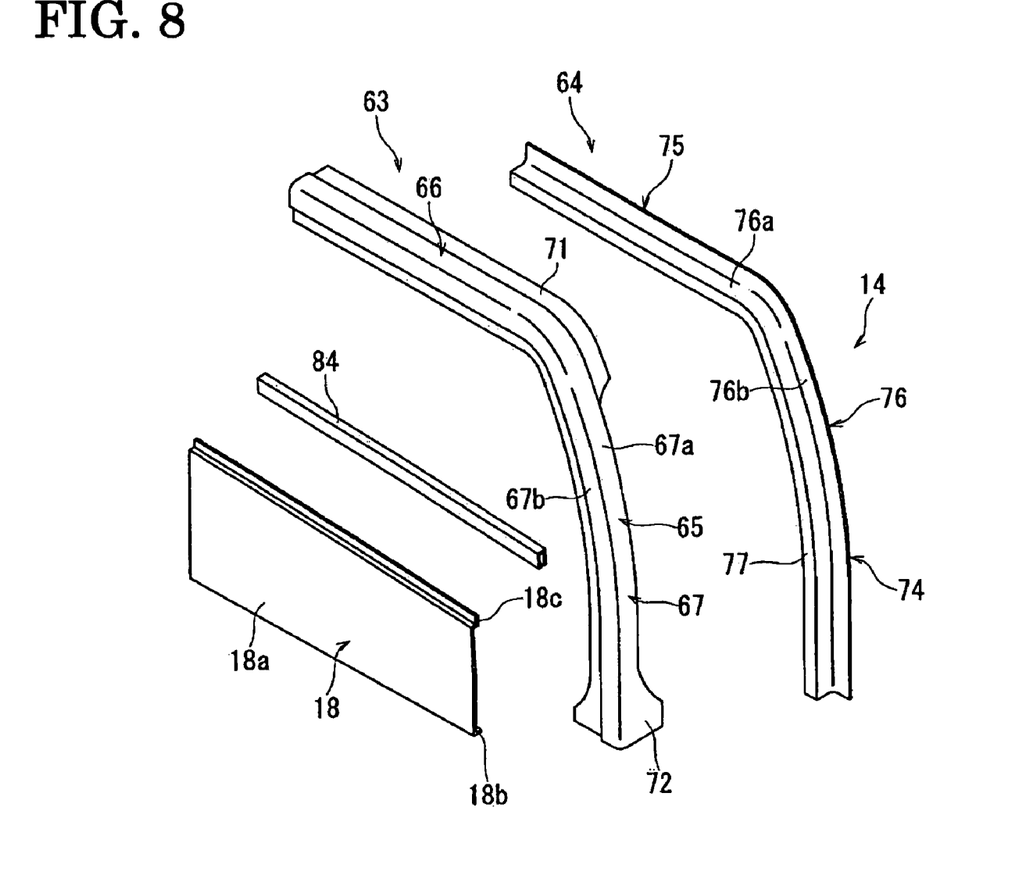
FIG. 8 is an exploded perspective view of a right front pillar.
Figure 9:
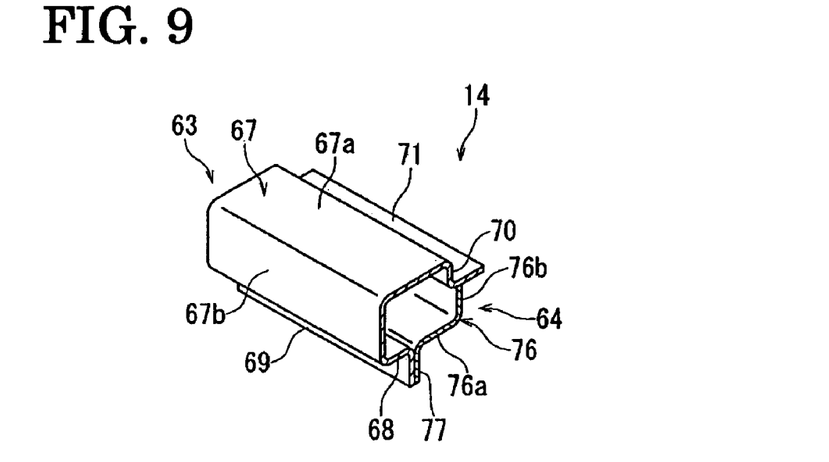
FIG. 9 is a cross-sectional view of the right front pillar.

Although the right front pillar 14 and the left front pillar 12 are symmetrical, a right upper continuous member 62 (see FIG. 2) continuously extends from the right front pillar 14. Specifically, the right front pillar 14 and the continuous member 62 are formed by joining (e.g., spot-welding) the first member 63 to the second member 64 as shown in FIGS. 8 and 9, the first and second members 63, 64 being respectively formed into a specified shape by press-molding. The first member 63 is an L-shaped body composed of a vertically extending portion 65 and a horizontally extending portion 66 which horizontally extends from the upper part of the vertically extending portion 65. The vertically extending portion 65 and the horizontally extending portion 66 include (i) a main body portion 67 of substantially L-shaped cross-section having a front wall portion 67a and an outer wall portion 67b, (ii) an inner collar portion 68 continuously extending from the outer wall portion 67b, (iii) a joint collar portion 69 projecting from the inner collar portion 68, and (iv) a bent piece portion 70 projecting from the front wall portion 67a. Also, there is provided a projecting piece portion 71 which inwardly projects from the bent piece portion 70 of the horizontally extending portion 66. Further, a leftwardly projecting protuberant portion 72 is disposed at the lower end of the vertically extending portion 65.

The second member 64 is also composed of a vertically extending portion 74 and a horizontally extending portion 75 which horizontally extends from the upper part of the vertically extending portion 74. The vertically extending portion 74 and the horizontally extending portion 75 include (i) a main body portion 76 of substantially L-shaped cross-section having a first wall portion 76a and a second wall portion 76b, and (ii) a joint collar portion 77 continuously extending from the first wall portion 76a of the main body portion 76.

While the joint collar portion 69 of the first member 63 overlapping the joint collar portion 77 of the second member 64 and the second wall portion 76b of the main body portion 76 of the second member 64 being butted against the bent piece portion 70 of the first member 63, the first member 63 is joined to the second member 64 as shown in FIG. 9. Thereby, the right front pillar 14 and the continuous member 62 having a rectangular hollow portion can be constructed.

The continuous member 62 which is a part of the right front pillar 14 is connected (coupled) to the right rear pillar 15. In this case, coupling is done with the draw portion 43 of the projecting portion 42d of the cover member 35 being fitted in an end of the continuous member 62. Therefore, the outer faces of the right front pillar 14 and the continuous member 62 are joined in a continuous fashion to the outer face of the cover member 35 of the right rear pillar 15.

Figure 10:
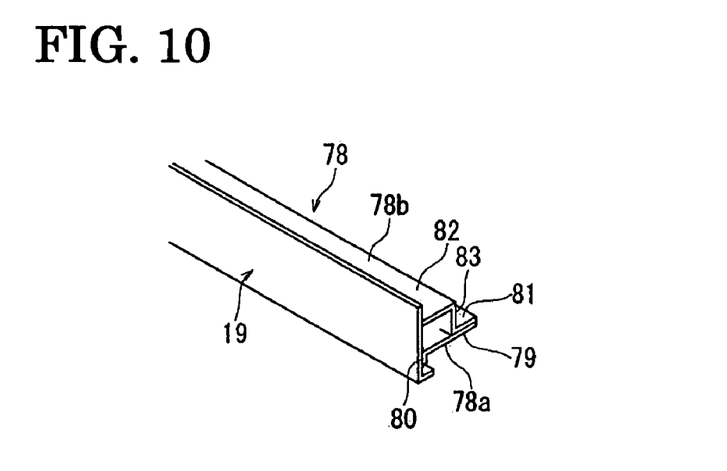
FIG. 10 is a perspective view illustrating a coupling member for coupling the left front pillar and the right front pillar together according to another embodiment.

The left front pillar 12 and the right front pillar 14 are coupled, at their lower parts, to a coupling member 78 (see FIG. 6). The coupling member 78 may be formed from the same pipe material as of the left rear pillar 13 and the right rear pillar 15. The front face panel 19 is located at the front side of the coupling member 78. The front face panel 19 is composed of a front wall portion 19a and an inner collar portion 19b which bends backward from the lower end of the front wall portion 19a. The coupling member 78 is joined to the front wall portion 19a. The coupling member 78 may be formed from press-molded parts instead of a pipe material, as shown in FIG. 10. That is, the coupling member 78 shown in FIG. 10 is composed of a first member 78a and a second member 78b fixedly mounted on the first member 78a. The first member 78a is composed of a main body portion 79 constituted by a flat-plate-like member and a pendent piece portion 80 hanging from the front edge of the main body portion 79. The second member 78b is composed of a horizontal lower piece portion 81, a horizontal upper piece portion 82, and a continuous piece portion 83 which couples the horizontal lower piece portion 81 to the horizontal upper piece portion 82. While the horizontal lower piece portion 81 of the second member 78b being mounted on the main body portion 79 of the first member 78a, the first member 78a is joined to the second member 78b. The continuous member 78 composed of the first and second members 78a, 78b is joined to the front face panel 19.

Although the front face panel 19 is formed from a steel plate or the like in this embodiment, it may be made from a non-metal material such as synthetic resin because this exterior member (front face panel) 19 constitutes the front face of the cab and therefore is not required to have excellent strength. Therefore, there may be employed various means such as bonding, rigging and welding according to the material of the front face panel 19, for coupling the front face panel 19, the left front pillar 12 and the right front pillar 14.

As shown in FIG. 8, the opposite door side panel 18 comprises (i) a main body flat plate portion 18a, (ii) a lower projecting portion 18b inwardly projecting from the lower edge of the main body flat plate portion 18a, and (iii) an upper projecting portion 18c of L-shaped cross-section which is formed, continuously extending from the upper edge of the main body flat plate portion 18a. A coupling member 84 formed from a pipe material is disposed so as to extend along the upper projecting portion 18c of the opposite door side panel 18.

Figure 11:
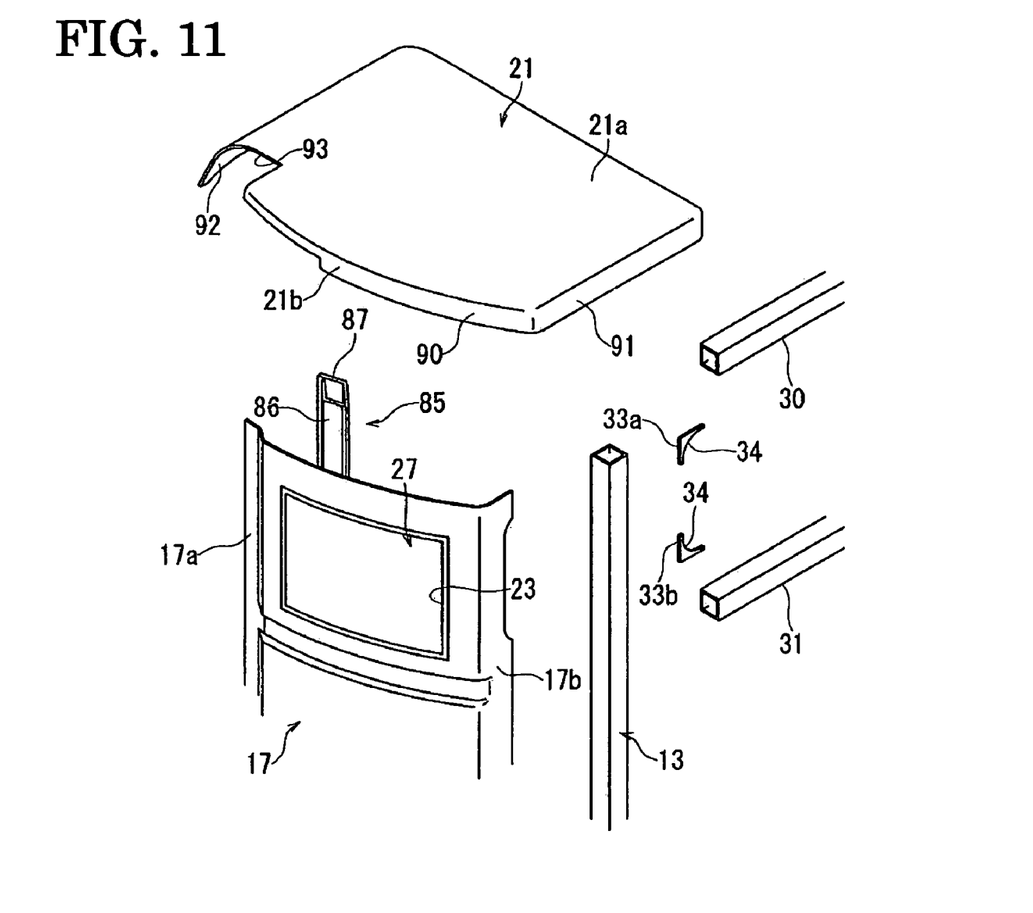
FIG. 11 is a perspective view illustrating a ceiling, a door-side panel and the left rear pillar.
Figure 12:
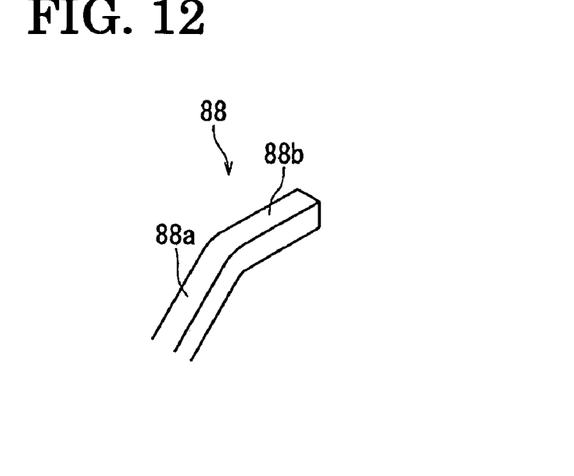
FIG. 12 is a perspective view illustrating a supporting portion.

Disposed between the left front pillar 12 and the left rear pillar 13 is an intermediate pillar 85 such as shown in FIG. 11. The intermediate pillar 85 is constituted by an outer member 86 and an inner member 87. The outer member 86 and the inner member 87 are respectively formed from press-molded parts each having a cross-sectional shape of Japanese letter <. These members 86, 87 are joined so as to overlaps each other, thereby forming the hollow intermediate pillar 85 having a rhombic cross-section. In this case, the intermediate pillar 85 is disposed so as to extend vertically along the edge (front edge) 17a of the door side panel 17. As shown in FIG. 1, a supporting member 88 extends from the intermediate pillar 85, for retaining the ceiling panel 21. As shown in FIG. 12, the supporting member 88 is composed of an inclining portion 88a which extends obliquely upward from the intermediate pillar 81 and a horizontal portion 88b extending horizontally from the inclining portion 88a. The supporting member 88 constitutes a part of the intermediate pillar 81, and its horizontal portion 88b passes through the underside of the ceiling panel 21, supporting the ceiling panel 21 to increase the rigidity of the ceiling portion.

As shown in FIG. 11, the door side panel 17 is constituted by a curved plate which slightly bulges outward. The door side panel 17 is joined to the left rear pillar 13 at a rear edge part 17b thereof so as to cover the left rear pillar 13. The front edge portion 17a of the door side panel 17 constitutes the rear edge of the entrance 22. The window opening 23 is formed in the upper half part of the door side panel 17. The door (not shown) mounted on the side of the door side panel 17 has a guide roller which rolls along a guide rail disposed above the door side panel 17 so that the door can slide back and forth. The door slides forward, coming into a closed state where it closes the entrance 22 and slides backward, coming into an open state where it is positioned outside the door side panel 17.

As shown in FIGS. 6 and 11, the ceiling panel 21 is composed of a flat-plate-like main body portion 21a and a pendent piece portion 21b hanging from the outer periphery of the main body portion 21a. The pendent piece portion 21b includes (i) a side edge portion 90 extending continuously from the left end of the main body portion 21a, (ii) a rear edge portion 91 extending continuously from the rear end of the main body portion 21a and (iii) a front edge portion 92 extending continuously from the front end of the main body portion 21a. The left end of the front edge portion 92 of the pendent piece portion 21b is provided with a notch 93 in which the upper end of the left front pillar 12 is fitted so that the left front pillar 12 is joined. In this case, the projecting piece portion 55 and draw portion 56 of the left front pillar 12 fit the inner face of the notch edge portion of the notch 93, so that the surface of the ceiling panel 21 is connected to the surface of the left front pillar 12 in a continuous manner. The right end of the main body portion 21a of the ceiling panel 21 and the right end of the front edge portion 92 of the pendent piece portion 21b are mounted on and joined to the continuous member 62 and the projecting piece portion 71 of the right front pillar 14. Thereby, the surface of the ceiling panel 21 is continuously connected to the surface of the right front pillar 14. The rear edge portion 91 of the pendent piece portion 21b of the ceiling panel 21 covers the coupling member 30 and the side edge portion 90 of the pendent piece portion 21b of the ceiling panel 21 covers the upper edge of the door side panel 17. Although not shown in the drawings, a skylight may be formed in the ceiling panel 21.

Figure 13:
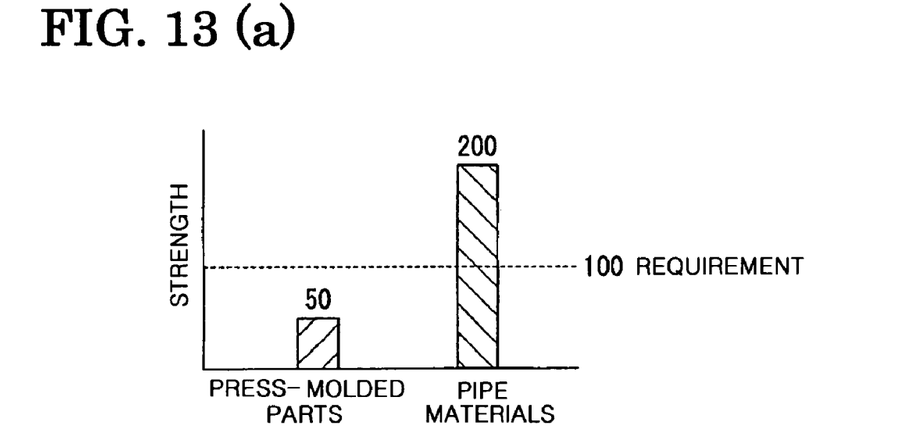

According to the cab described above, since the rear part of the cab has greater rigidity than the front part of the cab, the rigidity and buckling strength of the rear part can be increased. Therefore, the cab can be prevented from being deformed or damaged by shocks received from behind. Incidentally, the operator can easily check the front view but tends to neglect to check the rear view, and therefore the rear side of the cab more often gets a shock from the outside than the front side. The cab of this embodiment can withstand shocks from the outside by increasing the rigidity of the rear side of the cab. In addition, since the front part of the cab does not need great rigidity, a structure which interrupts the front field of view can be avoided. This leads to improved front visibility. Further, since there is no need to provide the construction machine with a protecting member etc., which is unintegral with the cab, in order to mitigate shocks from the outside, the cab is good in design. Further, it is unnecessary to form the left front pillar 12 and the right front pillar 14 from a pipe material, which leads to cost reduction and therefore the cab can be manufactured at low cost. It is understood from the comparison between press-molded parts and pipe materials that pipe materials are superior to press-molded parts in strength, on the ground that where the degree of requirement for strength is represented by "100", the index number of press-molded parts is "50" whereas the index number of pipe materials is "200" as shown in FIG. 13(a). Regarding the cost, press-molded parts are superior, since the index number of press-molded parts is "1" whereas the index number of pipe materials is "2" as shown in FIG. 13(b). For this reason, the front pillars 12, 14 are formed from press-molded parts whereas the rear pillars 13, 15 are formed from a pipe material in the foregoing embodiment, whereby high manufacturing costs can be avoided while providing a cab excellent in strength in the way described earlier.

Since the left side face portion is reinforced by the intermediate pillar 85, even though this side face portion is provided with an opening 22 for entrance, sufficient strength can be ensured for the side face so that stable formation of the opening 22 becomes possible. Since the intermediate pillar 85 is connected to the right front pillar 14 or the right rear pillar 15, by passing through the ceiling portion, the ceiling portion is supported by the intermediate pillar 85 and therefore increased in rigidity. In the invention, the left front pillar 12 is coupled to the right front pillar 14 by the coupling member 78, thereby forming a frame body which constitutes the front face of the cab. If this coupling member 78 is made of a pipe material, the strength of the front face of the cab can be increased so that a cab having increased overall strength and good durability can be provided. On the other hand, if the coupling member 78 is made of press-molded parts, cost reduction can be achieved so that a high-quality cab can be manufactured at low cost. In the invention, the left rear pillar 13 is coupled to the right rear pillar 15 by the coupling members 30, 31, thereby forming a frame body which constitutes the rear face of the cab. If these coupling members 30, 31 are made of a pipe material, the strength of the rear side of the cab can be further increased and a structure which can steadily sustain shocks from behind can be attained. If the coupling members 30, 31 are made of press-molded parts, cost reduction can be achieved so that a high-quality cab can be manufactured at low cost. Further, coupling of the rear face panel 20 and the front face panel 19 can be carried out by various means such as bonding, rigging and welding which comply with the material of the rear face panel 20 and the front face panel 19. Employment of such means facilitates the operation of coupling the rear face panel 20 and the front face panel 19 and ensures stable coupling. In addition, provision of the beads B in the rear face panel 20 such as shown in the foregoing embodiment leads to an improvement in the strength of the exterior member. Concretely, such an exterior member prevents buckling and noise generation caused by the vibration of the exterior member, for instance, during traveling. Further, since the right front pillar 14 is connected to the right rear pillar 15, by passing through the ceiling portion, the ceiling portion is supported by the right front pillar 14 and therefore increased in rigidity. Additionally, since the left front pillar 12 is connected to the front part of the ceiling portion, the left front pillar 12 may be short in length so that it can be easily press-molded and a wide entrance can be formed.

While a preferred embodiment of the invention has been concretely described hereinabove, the invention is not necessarily limited to this embodiment and may be modified in various ways within the scope of the invention. For instance, the left rear pillar 13 and the right rear pillar 15 are respectively formed from a pipe member and this pipe material is not limited to a rectangular tube like body such as shown in the above embodiment but may be a round pipe or a pipe having irregular shapes other than square. While the left front pillar 12, the right front pillar 14 and the intermediate pillar 85 are each formed by combining two press-molded parts in the foregoing embodiment, other versions formed from three or more press-molded parts are anticipated. The intermediate pillar 85 may have other irregular cross-sectional shapes than rhombus. The left front pillar 12, the right front pillar 14 and the intermediate pillar 85 may be formed from a pipe material. In addition, the right rear pillar 15 may extend along an uncurved vertical line, like the left rear pillar 13. The construction machine to which the invention is applied is not limited to hydraulic excavators but may be other machines such as cranes and crushing machines.

The invention claimed is:

1. A cab for a construction machine, comprising:
   a vertically extending left front pillar comprising press-molded parts;
   a vertically extending left rear pillar comprising a pipe;
   a vertically extending right front pillar comprising press-molded parts;
   a vertically extending right rear pillar comprising a pipe; and
   a ceiling panel at a top portion of the cab;
   wherein the right front pillar comprises an upper portion which extends across the top portion of the cab to connect to the right rear pillar; and
   wherein the ceiling panel has a female notch at a left front corner portion thereof, and the left front pillar having a corresponding male notch that is fitted in the female notch of the ceiling panel, such that a surface of the left front pillar is continuous with a surface of the ceiling panel.

2. The cab for a construction machine according to claim 1, further comprising a vertically extending intermediate pillar that is disposed between the left front pillar and the left rear pillar.

3. The cab for a construction machine according to claim 2, wherein the intermediate pillar comprises an upper portion which extends across the top portion of the cab to connect to one of the right front pillar and the right rear pillar.

* * * * *